(12) United States Patent
Knipp et al.

(10) Patent No.: US 10,131,177 B2
(45) Date of Patent: Nov. 20, 2018

(54) BARRIER COATING FOR A SUBSTRATE

(71) Applicant: Entrust Datacard Corporation, Shakopee, MN (US)

(72) Inventors: Roman Thomas Knipp, Shafer, MN (US); Peter Daniel Schmidt, Chanhassen, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 739 days.

(21) Appl. No.: 14/175,446

(22) Filed: Feb. 7, 2014

(65) Prior Publication Data
US 2015/0224810 A1 Aug. 13, 2015

(51) Int. Cl.
*B42D 25/30* (2014.01)
*C09D 183/00* (2006.01)
(Continued)

(52) U.S. Cl.
CPC .............. *B42D 25/30* (2014.10); *B32B 27/08* (2013.01); *B32B 37/12* (2013.01); *B42D 25/36* (2014.10); *B42D 25/378* (2014.10); *C09D 101/14* (2013.01); *C09D 127/06* (2013.01); *C09D 131/04* (2013.01); *C09D 133/04* (2013.01); *C09D 137/00* (2013.01); *C09D 167/00* (2013.01); *C09D 175/04* (2013.01); *C09D 183/00* (2013.01); *C09D 191/06* (2013.01); *B32B 2255/10* (2013.01); *B32B 2305/347* (2013.01); *B32B 2307/40* (2013.01);
(Continued)

(58) Field of Classification Search
None
See application file for complete search history.

(56) References Cited

U.S. PATENT DOCUMENTS 4,049,061 A * 9/1977 van der Lely ....... A01B 33/065
111/162
4,049,601 A * 9/1977 Anderson .............. C08G 18/12
524/251
(Continued)

FOREIGN PATENT DOCUMENTS

CN 101292000 A 10/2008
EP 1034922 9/2000
(Continued)

OTHER PUBLICATIONS

Forrest, M. J.. (2001). Rubber Analysis—Polymers, Compounds and Products: (Report No. 139), vol. 12—Appendix 3: Glass Transition Temperatures of Rubbers. Smithers Rapra Technology; p. 54. Online version available at: http://app.knovel.com/hotlink/pdf/id:kt0098ZGO1/rubber-analysis-polymers/glass-transition-temperatures.*

(Continued)

Primary Examiner — Laura C Powers
(74) Attorney, Agent, or Firm — Hamre, Schumann, Mueller & Larson, P.C.

(57) ABSTRACT

A barrier film, a document including a barrier coating, and a method for producing a document are described. A document includes a substrate, printed data on a surface of the substrate, and a barrier coating. The barrier coating is disposed between a portion of the printed data and a portion of an adhesive. The portion of the adhesive is disposed between a portion of a protective layer and a portion of the substrate.

11 Claims, 1 Drawing Sheet

(51) Int. Cl.
  *C09D 131/04* (2006.01)
  *C09D 137/00* (2006.01)
  *C09D 133/04* (2006.01)
  *B32B 27/08* (2006.01)
  *B32B 37/08* (2006.01)
  *B32B 37/12* (2006.01)
  *C09D 167/00* (2006.01)
  *C09D 127/06* (2006.01)
  *C09D 175/04* (2006.01)
  *C09D 101/14* (2006.01)
  *C09D 191/06* (2006.01)
  *B42D 25/36* (2014.01)
  *B42D 25/378* (2014.01)

(52) U.S. Cl.
  CPC .............. *B32B 2307/4026* (2013.01); *Y10T 428/24851* (2015.01); *Y10T 428/264* (2015.01)

(56) References Cited

U.S. PATENT DOCUMENTS

| | | | |
|---|---|---|---|
| 4,421,780 A * | 12/1983 | Buzio et al. | 427/540 |
| 4,429,015 A | 1/1984 | Sheptak | |
| 6,383,631 B1 | 5/2002 | Mehta | |
| 7,278,580 B2 * | 10/2007 | Jones et al. | 235/488 |
| 2006/0251869 A1 | 11/2006 | Herslow | |

FOREIGN PATENT DOCUMENTS

| | | |
|---|---|---|
| WO | 98/12053 | 3/1998 |
| WO | WO 03055638 A1 * | 7/2003 |

OTHER PUBLICATIONS

Tooley, Mike. (2010). Design Engineering Manual—11.1.4.1 Glass Transition Temperatures; p. 496-497, Table 11.1.7, Elsevier. Online version available at: http://app.knovel.com/hotlink/pdf/id:kt008U9D01/design-engineering-manual/glass-transition-temperatures.*

Crompton (Crompton, T.R.. (2012). Physical Testing of Plastics—2.13 Glass Transition Temperature, p. 164. Smithers Rapra Technology. Online version available at: http://app.knovel.com/hotlink/pdf/id:kt00TY02J1/physical-testing-plastics/glass-transition-temperature).*

Partial European Search Report for European Application No. 15154240.4, dated Jul. 20, 2015, 5 pgs.

Office Action from European Patent Application No. 15154240.4, dated Jan. 25, 2017, 7 pages.

Office Action issued in CN201510015924.3 dated Feb. 7, 2018.

* cited by examiner

BARRIER COATING FOR A SUBSTRATE

FIELD

Embodiments of this disclosure relate generally to a barrier coating. More specifically, the embodiments relate to a barrier coating to reduce colorant migration or other degradation for information printed on a substrate.

BACKGROUND

A plastic card or document, can serve as an identification certificate, a driver's license, a membership card, a financial card (e.g., credit card, debit card), a phone card, a health card, or the like. Information such as, but not limited to, a home address, a name, a photograph, and other identifying information, can be printed on the substrate (generally referred to as printed information or printed data). The printed data can be personal to an individual for whom the plastic card or document is printed. The printed data can be printed on the plastic card or document using a variety of methods such as, but not limited to, dye sublimation, thermal transfer, ink jet, dry or liquid toner-based electrographic printing, or the like. The printed data can be protected from abrasion and/or chemical/water exposure through a protective layer, which can include an adhesive component.

SUMMARY

Embodiments of this disclosure relate generally to a barrier coating. More specifically, the embodiments relate to a barrier coating to reduce colorant migration or other degradation for information printed on a substrate.

Colorant migration can cause printed data on a substrate to appear fuzzy (e.g., not sharp or clear) or out of focus. Prior attempts to reduce colorant migration have focused on the compatibility of the printed data and an adhesive for a protective layer. This approach, however, while potentially able to reduce colorant migration, also limits which adhesives can be used to construct a card or document. Embodiments of this disclosure utilize a barrier coating or layer to separate the printed data from the adhesive for the protective layer. In one embodiment, inclusion of the barrier coating can reduce colorant migration and can allow for a wider selection of adhesives to be used for the protective layer.

In one embodiment, a document includes a substrate having printed data thereon. The document includes a barrier coating disposed between the printed data and an adhesive layer. The document also includes a protective layer which is an outermost layer of the document. In one embodiment, the document can include one or more security feature layers. The security feature layer can include an optically variable device (OVD) such as, but not limited to, a hologram, a security ink such as, but not limited to, ultraviolet (UV) ink, or a combination thereof. In one embodiment, the security feature layer can include a radiation sensitive photopolymer layer. The security feature layer can be disposed between the adhesive layer and the protective layer. In another embodiment, the security feature layer can be disposed between the barrier coating and the adhesive layer, or even between the printed data and the barrier coating.

In another embodiment, a document includes a substrate having printed data thereon. The document includes a barrier coating disposed between the printed data and an adhesive layer. The document can also include a topcoat applied as a liquid. The liquid topcoat can be radiation curable, two-component reactive, heat curable, moisture curable, or air curable. In one embodiment, the liquid topcoat can be applied by a liquid dispensing technology such as, but not limited to, ink jet, aerosol, or the like.

In another embodiment, a document includes a substrate having printed data thereon. The document includes a barrier coating disposed between the printed data and an adhesive layer. A surface of the barrier coating can be in direct contact with at least a portion of the printed data. In one embodiment, another surface of the barrier coating is in direct contact with the adhesive layer. The document can also include a protective layer, which is the outermost layer of the document.

A substrate can include any substrate personalized with a colorant. Examples of uses for substrates include, but are not limited to, personalized documents such as plastic cards including, but not limited to financial (e.g., credit, debit, or the like) cards, driver's licenses, national identification cards, and other plastic cards which bear personalized data unique to the cardholder and/or which bear other card or document information, as well as to passports.

In one embodiment, the barrier coating in the finished document is dry (e.g., substantially free of organic solvents and/or water) and heat transferrable to a substrate.

In one embodiment, the barrier coating can provide increased resistance to moisture and chemicals.

In some embodiments, the colorant includes a dye. In such embodiments, the barrier coating is made of a material suitable to protect the printed data against lateral dye migration and that is compatible with a dye used for the printed data and an adhesive used to produce the document when the barrier coating is fixed to the document surface.

In other embodiments, the colorant includes a pigment. In such embodiments, the barrier coating is made of a material suitable to prevent and/or reduce deterioration and/or softening of a pigmented ink used for the printed data and that is compatible with the pigmented ink and the adhesive used to produce the document.

A document is also described. The document includes a substrate. Printed data is on a surface of the substrate. The document includes a barrier coating, an adhesive, and a protective layer. A portion of the barrier coating is disposed between a portion of the printed data and a portion of the adhesive. The portion of the adhesive is disposed between a portion of the protective layer and a portion of the substrate.

A barrier film for application of a barrier coating to a document having printed data thereon is also described. The barrier film includes a carrier and a barrier coating. The barrier coating is applied to at least a portion of the carrier. The barrier coating is suitable to be permanently fixed to a surface of the document. The barrier coating is made of a material suitable to protect the printed data and that is compatible with a colorant used for the printed data and an adhesive used to produce the document when the barrier coating is fixed to the document surface.

In addition, a method of producing a document is described. The method includes printing data on a surface of a substrate and applying a barrier coating over a portion of the substrate having the printed data thereon. An adhesive is applied to the substrate, wherein a portion of the barrier coating is disposed between the printed data and a portion of the adhesive. The method also includes applying a protective layer, wherein the portion of the adhesive is disposed between the substrate and a portion of the protective layer.

BRIEF DESCRIPTION OF THE DRAWINGS

References are made to the accompanying drawings that form a part of this disclosure and which illustrate the embodiments in which the systems and methods described in this Specification can be practiced.

Like reference numbers represent like parts throughout.

DETAILED DESCRIPTION

Figure 1:
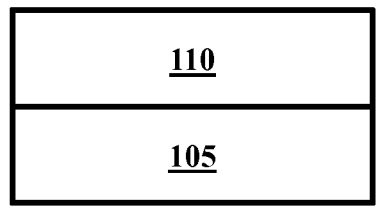
FIG. 1 illustrates a side view of a barrier film, according to one embodiment.

Improved documents can include a substrate having printed data thereon, a barrier coating, an adhesive, and a protective layer, where the barrier coating is located between the substrate and the adhesive. In one embodiment, the document can additionally include one or more security feature layers. Examples of the security feature layer include, but are not limited to, a polymer layer including a hologram, a polymer layer including an optically variable device (OVD) other than a hologram, combinations thereof, or the like. In one embodiment, the polymer of the security feature layer can include a radiation sensitive photopolymer. The use of a barrier coating between the substrate and adhesive can reduce and/or eliminate colorant degradation such as, but not limited to, dye migration caused by adhesives and/or moisture that contact the printed data. Accordingly, the use of a barrier coating can facilitate a wider selection of adhesives, such as, but not limited to, heat sealable, reactive, hot melt, and pressure sensitive adhesives that can be used to produce the documents, thereby allowing additional design options for document manufacturers. In general, the barrier coating can be any composition or material that is compatible with both the adhesive and the colorant(s) used to print on the substrate that reduces and/or eliminates colorant degradation such as, but not limited to, dye migration. In one embodiment, the barrier coating can be a mixture of resins. In one embodiment, the barrier coating can include a UV inhibitor, while in another embodiment the barrier coating can be substantially free of adhesion promoters, wetting agents, defoamers, UV inhibitors, and other additives.

A colorant includes, for example, dye, pigment, ink, or the like. Colorant is intended to be inclusive of any color and also includes black and white.

A substrate can include any substrate that one may wish to personalize and protect from the environment (e.g., moisture, chemicals, abrasion, or the like). Examples of uses for substrates include, but are not limited to, personalized documents such as plastic cards, including but not limited to, financial (e.g., credit, debit, or the like) cards, driver's licenses, national identification cards, and other plastic cards which bear printed data unique to a cardholder and/or which bear other card or document information, as well as to passports.

A substrate can display various types of information/data. The data (referred to hereinafter as "printed data") on the substrate can include alphanumeric text or characters, images, or combinations thereof. For example, a document can include variable data (e.g., variable from one document to the next) personal to an intended holder of the document. Examples of variable data include, but are not limited to, a home address, a name, a photograph, and other identifying information. Variable data can similarly be referred to as personalization information. The variable data can be personal to an individual for whom the plastic card or document is printed, randomly generated, related to the card issuer, or the like. The data printed on the substrate can also include fixed or non-variable data that may appear on multiple documents and is not personal to the intended holder of the document. Examples of non-variable data include, but are not limited to, a government entity name, a name of the document issuer, a company logo, a general security logo, or the like.

Printed data can be applied to a substrate using a variety of methods such as, but not limited to, dye sublimation, thermal transfer (e.g., dye diffusion thermal transfer (D2T2)), ink jet, dry or liquid toner-based electrographic printing, or the like. Printed data can suffer deleterious effects from the environment or from other layers added to the substrate. For example, atmospheric moisture, plasticizers (e.g., in wallet holders and other layers), organic compounds in supporting adhesive or protective layers, or the like, can cause lateral migration of the colorant (e.g., the colorant can bleed into areas other than where printed/intended). Lateral migration of the colorant can reduce quality and/or durability of the printed data, and accordingly the document as a whole, which can be especially problematic for a photograph in an identification document. In particular, authentication of a photograph can be difficult if migration of the colorant has occurred. Further, in addition to reducing migration of the colorant, the barrier layer can also be used to reduce any undesired changes in ink properties such as softening of the colorant layer from plasticizers or chemicals.

Embodiments of this disclosure provide a dry barrier coating that is heat transferrable to a substrate. In one embodiment, the barrier coating is applied to a carrier and can be released from the carrier by the application of heat and pressure. The barrier coating can provide adhesion for inter-lying layers. In another embodiment, the barrier coating can protect the printed data. Protecting the printed data can include, for example, reducing migration of the colorant, reducing softening or other damage to the colorant layer from plasticizers or chemicals, or the like. In another embodiment, the barrier coating can increase the moisture resistance of the plastic card or document. In yet another embodiment, the barrier coating can increase the chemical resistance (e.g., from non-cross-linked coatings) of the plastic card or document. In another embodiment, the barrier coating can protect the plastic card or document from abrasion, such as from card readers, inserting and removing from a card or document holder, or the like.

FIG. 1 illustrates a side view of a barrier film 100. The barrier film 100 includes a carrier 105 that is coated with a barrier coating 110.

The carrier 105 can be a clear or opaque sheet or film that is composed of, for example, a polymeric material, paper, or a combination thereof. In one embodiment, the carrier 105 is a clear, non-treated polyester film. In another embodiment, the carrier 105 can be formed from polyesters, polyethylene, polyamides, polyolefins, polyurethanes, or copolymers and combinations thereof. The thickness of the carrier 105 can vary. For example, the carrier 105 can range between about 6 microns and about 36 microns. In one embodiment, the carrier 105 has a thickness of about 12 microns.

The barrier coating 110 can include a resin or a mixture of resins. Examples of resins include, but are not limited to, acrylics (e.g., acrylates, methacrylates, or the like), polyesters, polyvinyl butyrals, cellulosics (e.g., cellulose acetate butyrate, cellulose acetate propionate, or the like), polyvinyl acetates, polyvinyl chlorides, polyurethanes, waxes, silicones, copolymers, and combinations thereof. The resin or resin mixture for the barrier coating 110 can be selected to balance, for example, easy release of the barrier coating 110 from the carrier 105 when applied to a substrate (e.g., substrate 205 described in FIG. 2 below) and adhesion to other layers applied to a substrate (e.g., adhesive layer 215 described in FIG. 2 below).

In one embodiment, the barrier coating 110 is a mixture of an acrylic resin and a vinyl resin. The vinyl resin can be, for example, a vinyl acetate copolymer, a vinyl chloride copolymer, or combinations thereof. The weight percent of the acrylic resin and vinyl resin used to form the barrier coating 110 can vary depending on a particular application. In one embodiment, the weight percent of acrylic resin can be from about 5% to about 40% and vinyl resin can be from about 60% to about 95%. In another embodiment, the weight percent of acrylic resin can be from about 10% to about 30% and vinyl resin can be from about 70% to about 90%. In another embodiment, the weight percent of the acrylic resin is about 20% and the vinyl resin is about 80%. One of ordinary skill in the art will recognize that additional subranges within these explicit ranges are contemplated and are within the scope of the present disclosure.

Commercially available acrylic resins are sold under, for example, the trade name Elvacite® by Lucite International, Inc. and under the trade name Paraloid™ by The Dow Chemical Company. Commercially available vinyl resins are sold under, for example, the trade name Vinnol® by Wacker Chemie AG and under the trade name Vinisol by World Wide Partnership, or the like.

The barrier coating 110 is typically applied in a dry weight range of about 0.1 to about 35.0 grams (dry) per square meter, or in another embodiment with a range of about 3.0 to about 8.0 grams (dry) per square meter. Heavier dry coat weights of the barrier coating 110 can have excessive elasticity after application to the substrate, leaving areas of tacky barrier coating 110 stripped from the carrier 105. Further, exceeding about 35.0 grams (dry) per square meter in dry coat weight of the barrier coating 110 can, for example, cause a portion of the barrier coating 110 to stick to document personalization equipment and can degrade the aesthetics of the finished plastic card or document. Alternatively, when the dry coat weight of the barrier coating 110 applied to the carrier 105 is too low, the barrier coating 110 does not easily release from the carrier 105 and may not provide protection of the printed data from exposure to the environment or adjacent layers.

The carrier 105 can be coated with the barrier coating 110 using a solvent and any of a variety of coating methods. Examples of solvents include, but are not limited to, toluene, methyl ethyl ketone (MEK), and ethyl acetate. Examples of coating methods for coating the carrier 105 with the barrier coating 110 include, but are not limited to, direct gravure printing, and other roll coating methods. The barrier coating 110 can be applied to the carrier 105 in a continuous or a non-continuous manner. That is, in one embodiment, the barrier film 100 can include a continuous coating of the barrier coating 110 on a surface of the carrier 105. In another embodiment, the barrier film 100 can include individualized patches of the barrier coating 110 on one or more discrete portions of a surface of the carrier 105. An individualized patch of the barrier coating 110 can, for example, be about the same size as the substrate to which the barrier coating 110 is to be applied.

The concentration of the barrier coating 110 in a barrier coating/solvent mixture can vary depending on the coating thickness, with the upper and lower limits determined based on, for example, the solubility of the resins in the selected solvent(s) and the final coating weight.

Once the barrier coating 110 is applied to the carrier 105, the solvent is removed by, for example, placing the barrier film 100 into a drying tunnel. Once the barrier film 100 is dried, the barrier film 100 can be self-wound (e.g., without a release liner or interleaf) or can be wound with a release liner or interleaf. Once wound, the barrier film 100 can then be converted to roll sizes configured for use with document personalization machinery in order that the barrier coating 110 can be applied to a substrate (described in more detail in accordance with FIG. 2 below).

Figure 2:
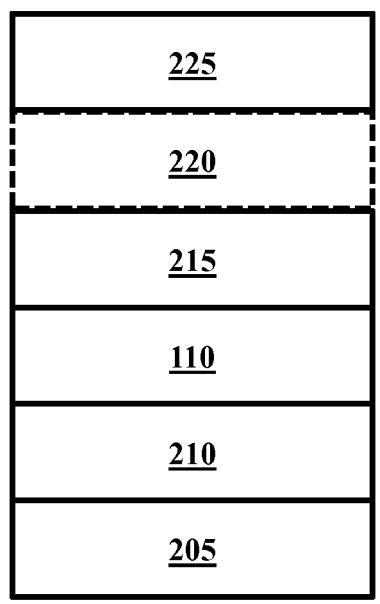
FIG. 2 illustrates a side view of a document including the barrier coating of FIG. 1, according to one embodiment.

FIG. 2 illustrates a side view of a plastic card 200. The plastic card 200 is described by way of example. The embodiments, aspects, and concepts described in this Specification can also apply other than to plastic cards, such as, for example, documents or passports having a substrate including printed data.

In one embodiment, the plastic card 200 includes a substrate 205 which bears printed data (e.g., illustrated as a printed data layer 210) with the barrier coating 110 of FIG. 1 applied, an adhesive layer 215, a security feature layer 220, and a protective layer 225. The security feature layer 220 is optional and may not be included in some embodiments, while other embodiments may include a plurality of security feature layers (e.g., a first security feature layer disposed between the substrate 205 and adhesive layer 215 and a second security feature layer disposed between the adhesive layer 215 and the protective layer 225). A "layer," can include a continuous layer as well as a non-continuous layer. For example, the printed data layer 210 is not a continuous covering of colorant in some embodiments. In one embodiment, one or more layers such as, but not limited to, the adhesive layer 215 and the protective layer 225 can be combined.

The substrate 205 can be any of a variety of substrates that can be personalized using printing methods that include applying a colorant, such as, but not limited to, dye-based and pigment-based printing methods. The substrate 205 can be manufactured from polyvinyl chloride (PVC), acrylonitrile butadiene styrene (ABS), polyester, polypropylene, polycarbonate, or other suitable thermoplastic materials including copolymers and combinations of the foregoing. In one embodiment, the substrate 205 can be manufactured from another material and include a PVC upper layer configured to receive the personalized data.

The printed data layer 210 represents printed data applied to the substrate 205. The printed data layer 210 is illustrated as a separate layer, though it is not necessarily a layer of colorant that continuously covers the substrate 205. Examples of printed data contained in the printed data layer 210 include, but are not limited to, a home address, a name, a photograph, or the like. The printed data layer 210 can be applied to the substrate 205 by a variety of methods, such as, but not limited to, thermal transfer, dye sublimation, dye diffusion thermal transfer (D2T2), inkjet, or other wet/ solution type printing such as, but not limited to, offset gravure.

The barrier coating 110 is applied between at least a portion of the printed data layer 210 and at least a portion of the adhesive layer 215. In one embodiment, a surface of the barrier coating 110 is in direct contact with at least a portion of the printed data layer 210. In one embodiment, a portion of the barrier coating 110 is in direct contact with the substrate 205. The barrier coating 110 can be applied to a portion of the substrate 205, while in another embodiment the barrier coating 110 can be applied continuously over an entire surface of the substrate 205. The barrier coating 110 can be applied using a combination of heat and pressure.

Any suitable method of applying heat and pressure can be utilized to apply the barrier coating 110. In one embodiment, the barrier coating 110 can be applied to the adhesive layer 215 and the protective layer 225. The resulting barrier coating/adhesive layer/protective layer can be subsequently laminated to a printed substrate such that the barrier coating 110 is disposed between the adhesive layer 215 and the printed substrate.

In one embodiment, the barrier coating 110 can be applied using a hot stamping process. In another embodiment, the barrier coating 110 can be applied using a heated lamination roller. In yet another embodiment the barrier coating 110 can be applied using a printing method such as, but not limited to, thermal transfer printing. The barrier coating 110 can be directly applied to the substrate 205 with dispensing methods such as ink jet, spray, aerosol, dipping, or rod or gravure coating. In such an embodiment, the barrier coating 110 may need to be dried or cured before and/or during the application (by, for example, lamination) of a protective layer having an adhesive.

The barrier coating 110 can be applied at a variety of combinations of temperature, pressure, and speed. In one embodiment, the barrier coating 110 can be applied using a heat seal lamination at a temperature of about 190° C., a pressure of about 75 psi, and a speed that can vary. In one embodiment, the speed can be from about 1 inch per second to about 12 inches per second, while in another embodiment, the speed can be from about 3 inches per second to about 6 inches per second. In another embodiment, the barrier coating 110 can be applied using a bench top laminator at a temperature of about 160° C., a pressure of about 30 psi, and a speed of about 4 seconds per lineal inch.

The thickness of the barrier coating 110 can vary. For example, the thickness of the barrier coating 110 can range between about 0.1 microns and about 35 microns. In one embodiment, the thickness of the barrier coating 110 can range between about 3.0 and about 6.0 microns.

In one embodiment, the adhesive layer 215 is applied after the barrier coating 110 such that the barrier coating 110 is disposed between the printed data layer 210 and the adhesive layer 215. In one embodiment, at least a portion of the adhesive layer 215 is in direct contact with at least a portion of a surface of the barrier coating 110. The adhesive layer 215 functions to adhere the protective layer 225 to the substrate 205. The adhesive layer 215 can be applied using an ultraviolet (UV) curable hot melt or another heat activated (such as, but not limited to, a heat curable, heat sealable, or the like) adhesive. The adhesive layer 215 can be an adhesive including resins such as, but not limited to, thermoplastics or cross-linkable resins with glass transition temperatures or heat activation temperatures generally lower than about 200° C., preferably lower than about 150° C., and more preferably lower than about 100° C. Resins with higher glass transition temperatures may not seal the plastic card and can cause distortions. In one embodiment, the adhesive layer 215 is not a separate layer, but is part of the barrier coating 110. The thickness of the adhesive layer 215 can vary between about 1 micron and about 150 microns. Generally, a range of about 12 to about 50 microns is preferred. In one embodiment, the adhesive layer 215 has a thickness of about 15 microns. Examples of adhesives for the adhesive layer 215 include, but are not limited to, thermoplastic polyamide hot melts, thermoplastic polyurethanes, heat activated pressure sensitive adhesives, reactive hot melts, polyesters, vinyl chlorides, vinyl acetates, polyolefin, and combinations thereof.

Commercially available adhesives are sold under, for example, the trade name Macromelt® 6239™ by the Henkel Corporation, under the trade name ARclad® 7970 by Adhesives Research, Inc., under the trade name Platilon® 5051 by Bayer Material Science LLC, under the trade names UAF-472 and EXF-680 by GlueTex GmbH, under the trade name 3M™ High Performance Adhesive Transfer Tape 468MP by 3M, or the like.

The security feature layer 220 is optional. The security feature layer can include a coating having, for example, ultraviolet (UV) curable monomers, UV curable oligomers, photoinitiators, acrylic, and polyvinyl chloride resins. The composition of the security feature layer 220 can determine the adhesive properties and flexibility of the security feature layer 220.

In one embodiment, the security feature layer 220 can include an optically variable device (OVD) for additional security. Examples of OVDs include, but are not limited to, guilloche patterns, holograms, laser retrievable text, or micro-printing.

The security feature layer 220 can range from about 1 micron to about 250 microns in thickness. Generally, a range of about 10 microns to about 50 microns is preferred. In one embodiment, the security feature layer 220 is about 16 microns thick.

Examples of suitable materials commercially available for the security feature layer 220 include Bayfol® HX by Bayer Material Science LLC, DAROL FILM by POLYGRAMA, Inc., SABIC IP holographic material by the General Electric Company, OmniDex film by E.I. du Pont de Nemours and Company, or the like.

The plastic card 200 also includes the protective layer 225. The protective layer 225 can generally be a polyester film, polyethylene film, or a polycarbonate film, though other films may be suitable. The thickness of the protective layer 225 can range from about 5 microns to about 125 microns. Generally, a range of about 12.5 microns to about 30 microns is preferred. In one embodiment, the protective layer 225 is about 25 microns in thickness. The protective layer 225 can provide additional protection for the plastic card 200 from the environment (e.g., moisture, chemicals, abrasion, or the like).

In one embodiment, the adhesive layer 215, the security feature layer 220, and the protective layer 225 are applied as a single, combined layer. In another embodiment, the security feature layer 220 and the protective layer 225 are applied as a single, combined layer.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A card or passport, comprising:
a card or passport substrate;
printed data on a surface of the card or passport substrate, wherein the printed data is produced using one of a dye and a pigment;
a barrier coating;
an adhesive layer comprising a thermoplastic with a glass transition temperature lower than about 150° C., wherein a portion of the barrier coating is disposed between a portion of the printed data and a portion of the adhesive layer, wherein the barrier coating prevents the adhesive layer from contacting the printed data on the card or passport substrate; and
a protective layer, wherein the portion of the adhesive layer is disposed between a portion of the protective layer and a portion of the card or passport substrate.

2. The card or passport according to claim 1, further comprising:
a security feature layer disposed between the card or passport substrate and the protective layer.

3. The card or passport according to claim 2, wherein the security feature layer includes an optically variable device.

4. The card or passport according to claim 1, wherein the barrier coating comprises a mixture of acrylic resin and vinyl resin.

5. The card or passport according to claim 4, wherein the weight percent of the acrylic resin is from about 5 percent to about 40 percent and the weight percent of the vinyl resin is from about 60 percent to about 95 percent.

6. The card or passport according to claim 1, wherein the barrier coating has a dry weight from about 0.1 grams per square meter to about 35.0 grams per square meter.

7. The card or passport according to claim 1, wherein a portion of the barrier coating is in direct contact with the card or passport substrate.

8. The card or passport according to claim 1, wherein the barrier coating has a thickness between about 0.1 microns and about 35 microns.

9. A card or passport, comprising:
a card or passport substrate, wherein the card or passport substrate has first and second opposite surfaces;
printed data on the first surface of the card or passport substrate, wherein the printed data is produced using one of a dye and a pigment;
a barrier coating overlaying the printed data;
an adhesive layer overlaying the barrier coating, wherein the adhesive layer comprises an ultraviolet cured hot melt adhesive or a heat cured adhesive, wherein the barrier coating is disposed between the printed data and the adhesive layer and prevents the adhesive layer from contacting the printed data; and
a protective layer, wherein the adhesive layer is disposed between the protective layer and the barrier coating.

10. The card or passport or claim 9, further comprising a security feature layer between the protective layer and the adhesive layer.

11. The card or passport or claim 1, wherein the thermoplastic comprises polyurethane.

* * * * *